US012632740B2

(12) United States Patent
Khacef et al.

(10) Patent No.: US 12,632,740 B2
(45) Date of Patent: May 19, 2026

(54) METHOD AND SYSTEM FOR MULTIMODAL CLASSIFICATION BASED ON BRAIN-INSPIRED UNSUPERVISED LEARNING

(71) Applicants: CENTRE NATIONAL DE LA RECHERCHE SCIENTIFIQUE, Paris (FR); Universite Cote d'Azur (UCA), Nice Cedex (FR)

(72) Inventors: Lyes Khacef, Nice (FR); Benoît Miramond, Antibes (FR); Laurent Rodriguez, Grasse (FR)

(73) Assignees: CENTRE NATIONAL DE LA RECHERCHE SCIENTIFIQUE, Paris (FR); UNIVERSITÉ DE LA CÔTE D'AZUR (UCA), Nice Cedex (FR)

( * ) Notice: Subject to any disclaimer, the term of this patent is extended or adjusted under 35 U.S.C. 154(b) by 770 days.

(21) Appl. No.: 17/798,578

(22) PCT Filed: Mar. 2, 2021

(86) PCT No.: PCT/EP2021/055169
§ 371 (c)(1),
(2) Date: Aug. 10, 2022

(87) PCT Pub. No.: WO2021/175843
PCT Pub. Date: Sep. 10, 2021

(65) Prior Publication Data
US 2023/0116148 A1 Apr. 13, 2023

(30) Foreign Application Priority Data
Mar. 6, 2020 (EP) ..................................... 20305239

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ........ G06N 3/088; G06N 3/045; G06N 3/044; G06N 7/01; G06N 3/063; G06N 3/082
See application file for complete search history.

(56) References Cited

U.S. PATENT DOCUMENTS

| | | | |
|---|---|---|---|
| 2008/0177684 A1* | 7/2008 | Laxman | G06N 20/10 706/20 |
| 2017/0148042 A1* | 5/2017 | Sullivan | G06Q 30/0204 |
| 2022/0019882 A1* | 1/2022 | Miramond | G06N 3/049 |

OTHER PUBLICATIONS

Althous, et al., "Modeling Cross-Modal Interactions in Early Word Learning", IEEE Transactions on Autonomous Mental Development, vol. 5, Issue 4, pp. 288-297, Dec. 2013.

(Continued)

*Primary Examiner* — Oluwatosin Alabi
(74) *Attorney, Agent, or Firm* — Sughrue Mion, PLLC

(57) ABSTRACT

A computer implemented method is provided for multi-modal data classification with brain-inspired unsupervised learning, and a neuromorphic computing hardware structure for implementing the method. In a preferred embodiment, the method comprises the steps of: training with unsupervised learning based on a multimodal training dataset each of a plurality of Artificial Neural Networks (ANNs); training with unsupervised learning based on the multimodal training dataset a multimodal association between the ANNs to generate a plurality of bidirectional lateral connections between co-activated Best Matching Units (BMUs); labeling the neurons of each of the at least two ANNs with a divergence algorithm; and electing a global BMU with a convergence algorithm.

12 Claims, 11 Drawing Sheets

(56)            References Cited

OTHER PUBLICATIONS

Upegui, et al., "Pruning Self-Organizing Maps for Cellular Hardware Architectures", 2018 NASA/ESA Conference on Adaptive Hardware and Systems (AHS), pp. 272-279, 2018.
Smith, et al., "The development of embodied cognition: Six lessons from babies", Artificial Life, vol. 11, No. 1-2, pp. 13-29, 2005.
Edelman, "Neural Darwinism: Selection and reentrant signaling in higher brain function", Neuron, vol. 10, Issue 2, pp. 115-125, Feb. 1993.
Damasio, "Time-locked multiregional retroactivation: A systems level proposal for the neural substrates of recall and recognition", Cognition, vol. 33, Issues 1-2, pp. 25-62, 1989.
Kohonen, "The self-organizing map", Proceedings of the IEEE, vol. 78, Issue: 9, pp. 1464-1480, Sep. 1990.
Rodriguez, et al., "A distributed cellular approach of large scale SOM models for hardware implementation", IEEE Image Processing and Signals, 2018.

* cited by examiner

○ Neuron

⬌ Lateral connections (Iterative Grid)

— Afferent synapses (Kohonen-like learning)

━ Lateral synapses (Hebbian-like learning)

500

Label SOMx neurons with subset of labeled data — 502

Initialize the SOMy neurons accumulators — 504

Load new labeled input sample of modality X — 506

Compute SOMx afferent activity — 508

Compute SOMy lateral activity — 510

Add the activity to the corresponding SOMy neuron accumulator — 512

No more samples — 514

No

Yes

Normalize the SOMy neurons accumulators — 516

Assign SOMy neurons labels — 518

End

Hardware NPUs network

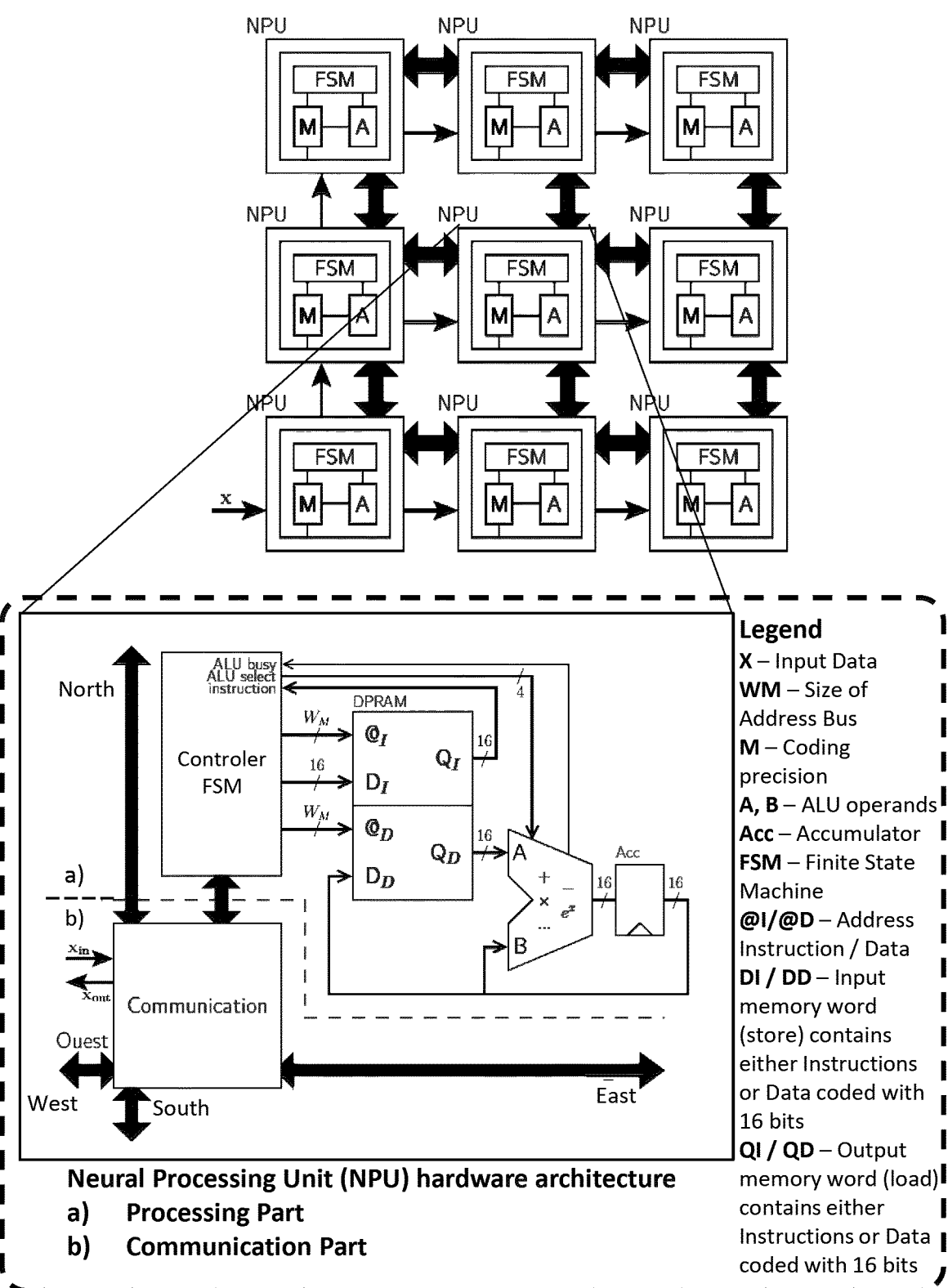

Neural Processing Unit (NPU) hardware architecture
a)    Processing Part
b)    Communication Part

Legend
X – Input Data
WM – Size of Address Bus
M – Coding precision
A, B – ALU operands
Acc – Accumulator
FSM – Finite State Machine
@I/@D – Address Instruction / Data
DI / DD – Input memory word (store) contains either Instructions or Data coded with 16 bits
QI / QD – Output memory word (load) contains either Instructions or Data coded with 16 bits

Fig. 10

METHOD AND SYSTEM FOR MULTIMODAL CLASSIFICATION BASED ON BRAIN-INSPIRED UNSUPERVISED LEARNING

CROSS-REFERENCE TO RELATED APPLICATIONS

This application is a National Stage of International patent application PCT/EP2021/055169, filed on Mar. 2, 2021, which claims priority to foreign European patent application No. EP 20305239.4, filed on Mar. 6, 2020, the disclosures of which are incorporated by reference in their entirety.

TECHNICAL FIELD

The present invention relates to the field of Artificial Intelligence and more particularly relates to a method and system for multimodal classification based on brain-inspired unsupervised learning.

BACKGROUND ART

Artificial Intelligence (AI) systems may be defined by their ability to adapt to the environment through learning. A stronger relationship with the environment is a key challenge for future AI systems that interact in the real-world environment for diverse applications like object detection and recognition, tracking, navigation, etc. Several fundamental principles lie to the development of embodied intelligence, at least six according to L. Smith and M. Gasser, "The development of embodied cognition: Six lessons from babies", Artificial Life, vol. 11, no. 1-2, pp. 13-29, 2005. The first of these principles is known as the multimodality.

Indeed, biological systems perceive their environment through diverse sensory channels: vision, audition, touch, smell, proprioception, etc. The fundamental reason lies in the concept of degeneracy in neural structures, which is generally defined as the ability of biological elements, that are structurally different, to perform the same function or yield the same output. The same principles can be applied for artificial systems, as information about the same phenomenon in the environment can be acquired from various types of sensors: cameras, microphones, accelerometers, etc. Each sensory-information can be considered as a modality. Due to the rich characteristics of natural phenomena, it is rare that a single modality provides a complete representation of a phenomenon of interest. Multimodal data fusion is then a direct consequence of this well-accepted paradigm that certain natural processes and phenomena are expressed under completely different physical guises. The multimodal association exploits the natural complementarity between different modalities like sight and sound so that they complete each other and improve the separability and classification of multimodal classes.

Recent researches in Artificial Neural Networks (ANNs) show a growing interest toward multimodal association in several applicative areas such as developmental robotics, audio-visual signal processing, spatial perception, attention-driven selection and tracking, memory encoding, emotion recognition, human-machine interaction, remote sensing and earth observation, medical diagnosis, understanding brain functionality, etc.

Even if some works propose computational models for multimodal associative learning, most of these works are based on (1) supervised learning which implies the use of labeled datasets and (2) centralized processing implementation which suffers from the so-called Von Neumann bottleneck.

To reach a novel and inventive method which overcomes these limitations, the inventors inspired from the biological brain. Indeed, the brain uses spatio-temporal correlations between several modalities to structure the data and create sense from observations. Thus, in spite of the diversity of the sensory modalities, like sight, sound and touch, the brain arrives at the same concepts. Moreover, biological observations show that one modality can activate the internal representation of another modality when both are correlated. To model such a behavior, Edelman and Damasio have proposed respectively two theoretical frameworks: the "Reentry", G. Edelman, "Group selection and phasic reentrant signaling a theory of higher brain function", The Mindful Brain, MIT Press, 1982, and the "Convergence Divergence Zone", A. Damasio, "Time-locked multiregional retroactivation: A systems level proposal for the neural substrates of recall and recognition", Volume 33, Issues 1-2, Pages 25-62, 1989. In these frameworks bi-directional neural communications can lead to both multimodal fusion (also named "convergence") and inter-modal activation (also named "divergence"). Nevertheless, these frameworks remain theoretical and do not provide a computational model at the neuron level.

Some recent works in experimental psychology such as—Althaus, N. and D. Mareschal, "Modeling Cross-Modal Interactions in Early Word Learning", in IEEE Transactions on Autonomous Mental Development, 2013—try to provide a computational modeling of the multimodal learning in infants to observe the artificial neurons co-activation for multiple modalities. However, their models cannot use the learned multimodal representation to solve real-world problems. Therefore, the present invention offers a brain-inspired computational model of multimodal processing at the neuron level which solves the existing problems.

It provides a complete computational framework in which the multimodal representation is learned then exploited by the artificial neurons in a completely distributed processing paradigm in order to implement the divergence mechanism to label the different neural maps as well as the convergence mechanism to operate as a classifier of multimodal patterns.

SUMMARY OF THE INVENTION

According to a first embodiment of the present invention, there is provided a method as further described in the appended independent claim 1, and a system as further described in the appended independent claim 8.

Particularly, a computer implemented method for multimodal data classification with brain-inspired unsupervised learning, comprises the steps of:

training with unsupervised learning based on a multimodal training dataset, each of at least two ANNs, each ANN being assigned to one modality of an input;

training with unsupervised learning based on the multimodal training dataset, a multimodal association between the at least two ANNs, the multimodal training generating a plurality of bidirectional lateral connections between co-activated Best Matching Units (BMUs) obtained from the training of each of the at least two trained ANNs;

labeling the neurons of each of the at least two ANNs, wherein the labeling comprising:

labeling one of the at least two ANNs with an afferent activity based on a labeled subset of the multimodal training dataset; and labeling the remaining ANNs of the at least two ANNs with a lateral activity induced by the bidirectional lateral connections to the previously labeled ANN;

and computing a global BMU amongst the previously labeled neurons of the at least two ANNs, based on both the afferent activity and the lateral activity of each neuron.

In a preferred embodiment, the method of the present invention is implemented in a distributed computing system as cellular neuromorphic architecture for Field Programmable Gate Array (FPGA) or for Application Specific Integrated Circuit (ASIC).

The cellular neuromorphic computing system comprises means as further described in the appended independent claim 8 and dependent claims 9 to 11.

In various embodiments:

The multimodal training step comprises:

a) creating a plurality of bidirectional lateral connections between co-activated BMUs of each of the at least two trained ANNs; or b) updating existing bidirectional lateral connections between co-activated BMUs of each of the at least two ANNs;

and deleting those existing lateral connections that are below a pre-determined threshold for each neuron.

The second labeling step comprises the steps of:

initializing neuron accumulator modules of each neuron of the remaining ANNs;

computing afferent activities of each neuron of said one ANN based on the labeled subset;

computing lateral activities of the neurons of the remaining ANNs that are in a bidirectional lateral with said one ANN;

adding each computed lateral activity to the corresponding neuron accumulator module;

normalizing the neuron accumulator modules over a number of samples per class; and assigning labels to the neurons of the remaining ANNs.

The global BMU computing step comprises:

computing for each neuron of the at least two ANNs, an afferent activity based on the afferent activity from the input;

normalizing the computed afferent activity;

updating the afferent activity of each neuron of the at least two ANNs with the lateral activity from the neurons of the remaining ANNs of the at least two ANNs;

and electing a global BMU amongst the at least two ANNs, wherein the label of the elected global BMU is the predicted class of the multimodal input.

The training step of each of the at least two ANNs is run with a Kohonen algorithm.

The subset of the multimodal training dataset is 1% of randomly labeled samples from the multimodal training dataset.

An object of the present invention is also a computer implemented method for multimodal data classification with brain-inspired unsupervised learning for inference mode. The method comprises the step of computing a global Best Matching Unit BMU amongst a plurality of labeled neurons of a plurality of ANNs, the plurality of labeled neurons being labeled during a learning mode comprising at least training and labeling steps of the method of the appended claims 1 to 5.

In an embodiment, the computer implemented method is operated on a neuromorphic hardware structure comprising a plurality of ANNs to classify an input with different modalities, wherein each modality is processed by one or several ANNs.

In an embodiment, the neuromorphic computing system for multimodal classification based on brain-inspired unsupervised learning comprises means for operating the method of anyone of the appended claims.

In an embodiment, the neuromorphic computing system comprises at least two SOM-like ANNs.

In an embodiment, the SOM-like ANN is one of the Kohonen SOM (KSOM), the Dynamic SOM (DSOM) or the Pruning Cellular SOM (PCSOM) ANN.

Another object of the present invention is a Field Programmable Gate Array (FPGA) comprising a neuromorphic computing system of anyone of the appended system claims for operating the multimodal data classification with brain-inspired unsupervised learning method of anyone of the appended method claims.

Yet another object of the present invention is an Application Specific Integrated Circuit (ASIC) comprising a neuromorphic computing system of anyone of the appended system claims for operating the multimodal data classification with brain-inspired unsupervised learning method of anyone of the appended method claims.

There is also provided a computer readable medium having instructions encoded thereon which when the program is executed by a computer, causes the computer to carry out the method of the invention.

Further advantages of the present invention will become clear to the skilled person upon examination of the drawings and detailed description. It is intended that any additional advantages be incorporated therein.

DESCRIPTION OF THE DRAWINGS

Embodiments of the present invention will now be described by way of example with reference to the accompanying drawings in which like references denote similar elements, and in which:

FIG. 10 shows an embodiment of a hardware implementation for operating the process of the present invention.

DETAILED DESCRIPTION OF THE INVENTION

Figure 1:
FIG. 1 shows a simplified schematic representation of two Self-Organizing Maps (SOMs), allowing to operate a multimodal classification process in accordance with the present invention.
Figure 1:
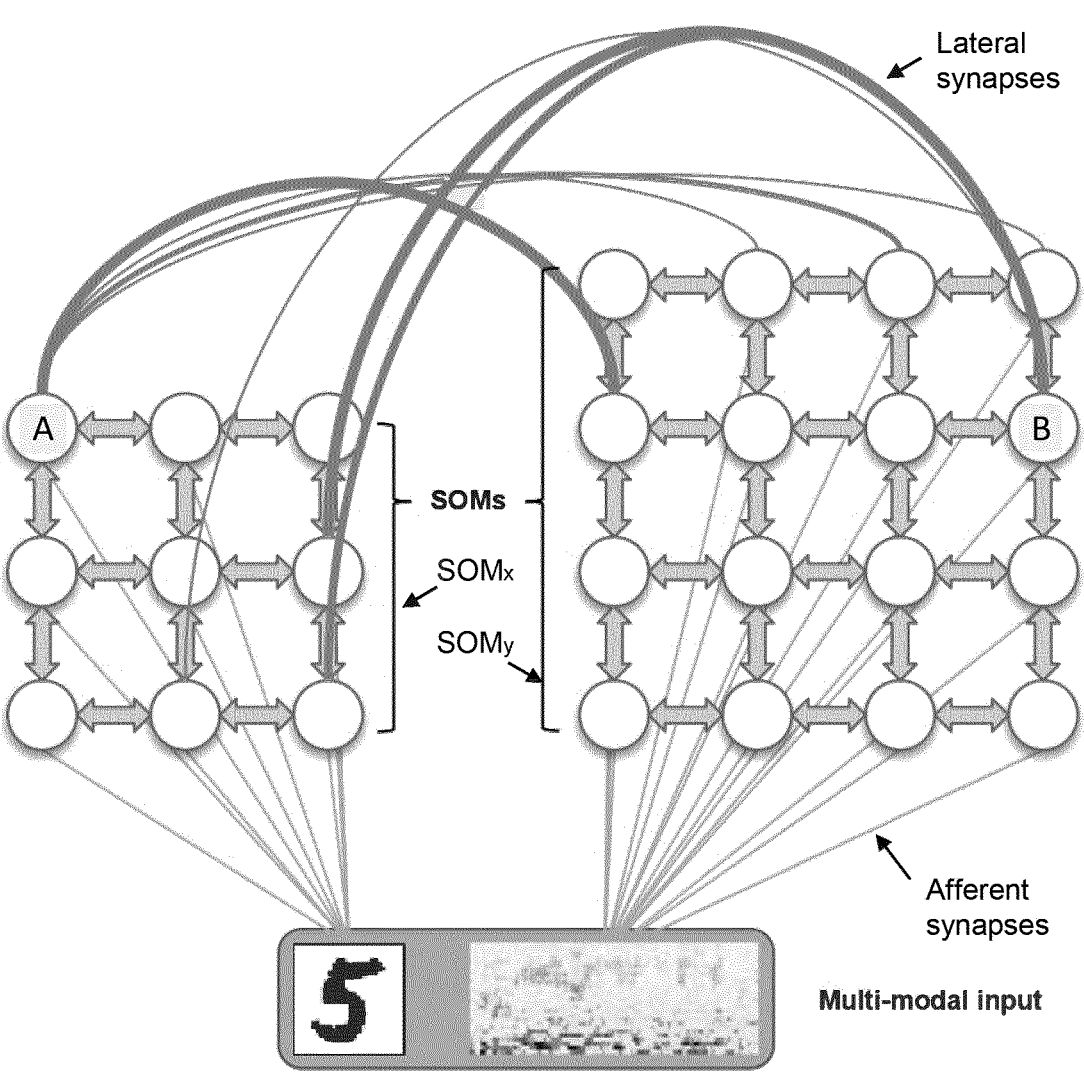

With reference first to FIG. 1 which is a non-limited example, a simplified schematic representation of two SOMs that allows operating a multimodal association in accordance with the present invention, is described.

Advantageously, the present invention uses a SOM architecture with a Kohonen algorithm to perform learning phase. Indeed, with the increasing amount of unlabeled data gathered everyday through Internet of Things (IoT) devices and the difficult task of labeling each sample, the Deep Neural Networks are slowly reaching the limits of supervised learning. Hence, unsupervised learning is becoming one of the most important and challenging topics in machine-learning and AI. The SOM proposed by T. Kohonen, "The self-organizing map," Proceedings of the IEEE, vol. 78, no. 9, pp. 1464-1480, 1990, is one of the most popular ANNs in the unsupervised learning category, inspired from the cortical synaptic plasticity and used in a large panel of applications, going from high-dimensional data analysis to more recent developments such as identification of social media trends, incremental change detection and energy consumption minimization on sensor networks. Many variants of the SOM have been proposed, like the Dynamic SOM (DSOM) or the Pruning Cellular SOM (PCSOM). In the description, the preferred embodiment is described with the Kohonen SOM algorithm, denoted (KSOM).

For clarity purpose, each left and right SOM (SOMx, SOMy) is shown with a limited number of neurons, i.e. the left SOM having 9 neurons and the right SOM having 16 neurons. Each neuron (except the neurons on the edges) is laterally connected (lateral connections) to its four neighbors, generally in a geographical position called North, South, East, West.

Each SOM is associated to one modality, i.e. the left SOMx being associated to handwritten digits (showing the number '5' as example) and the right SOMy being associated to spoken digits. However, the present invention may be operated on any number of modalities for an input, with a respective modality being processed by one or several SOMs.

FIG. 1 shows afferent synapses of each SOM, as a plurality of lines (i.e. the number of neurons of the SOM) distributed between an input (i.e. the input digit or signal) and each neuron of the respective SOM.

FIG. 1 further shows lateral synapses between the SOMs. For clarity of description, the lateral connections of only two neurons (A and B) from each map are represented.

Figure 2:
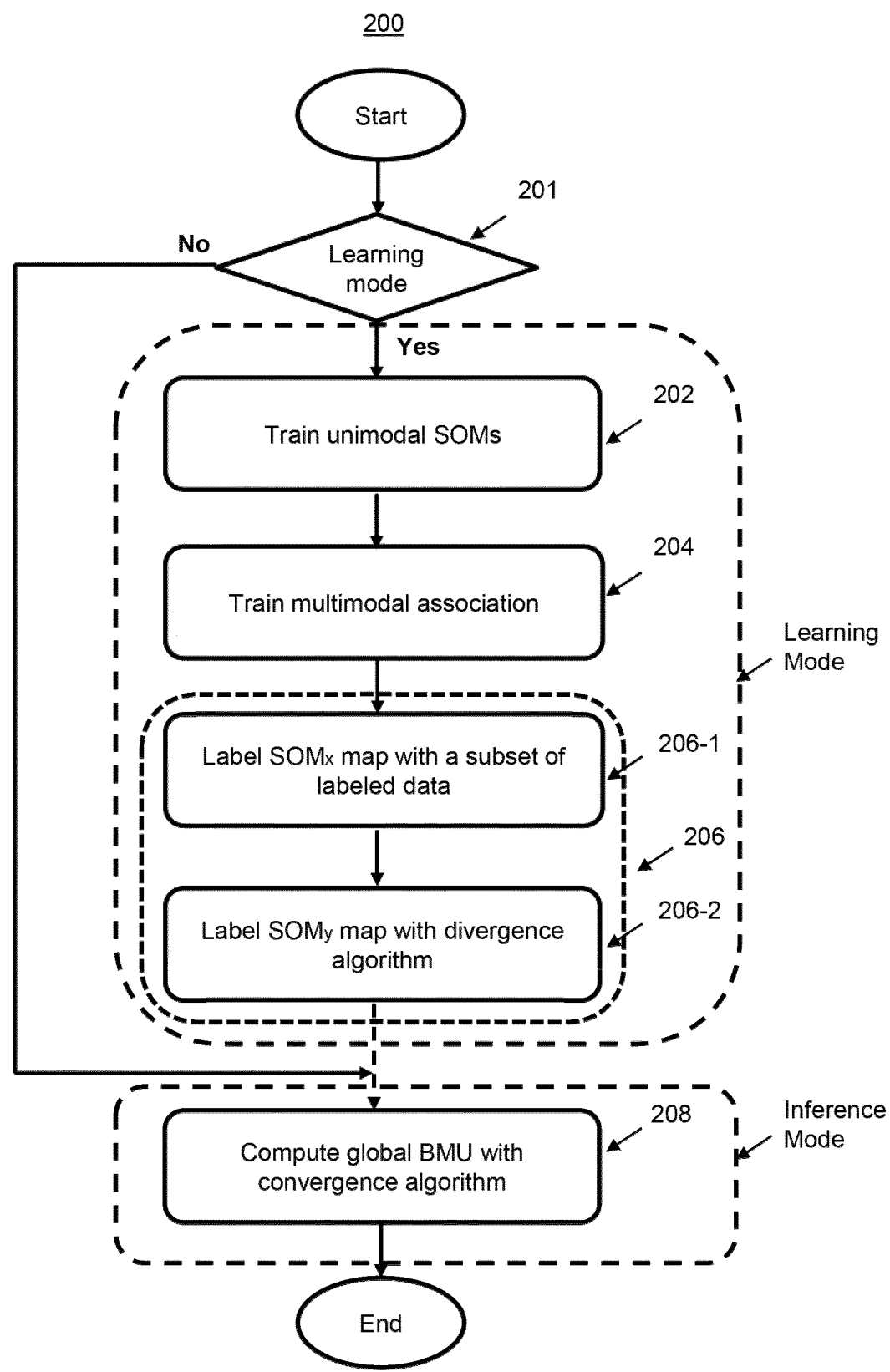
FIG. 2 shows a general flow chart for processing multimodal data in accordance with an embodiment of the present invention.

Going now to FIG. 2, a general flow chart (200) of the steps for processing multimodal data, either for a learning mode (branch Yes of bloc 201), or for an inference mode (branch No of bloc 201) is shown. FIG. 2 is described in accordance with an embodiment of the present invention for two SOMs—SOMx, SOMy—where each SOM being configured to process a different modality of an input (or sample).

Generally, the present invention provides a computer implemented method for multimodal data classification with brain-inspired unsupervised learning, and a neuromorphic computing hardware structure for implementing the method. In a preferred embodiment, the method comprises the steps of training with unsupervised learning based on a multimodal training dataset each of a plurality of ANNs; training with unsupervised learning based on the multimodal training dataset, a multimodal association between the ANNs to generate a plurality of bidirectional lateral connections between co-activated BMUs; labeling the neurons of each of the at least two ANNs with a divergence algorithm; and electing a global BMU with a convergence algorithm.

For the learning mode, in a first step 202, the process enters a training phase, also named unimodal training/learning, for training each SOM as further described with reference to FIG. 3.

Next step 204 allows for training a multimodal association between the previously trained SOMs, as further described with reference to FIG. 4.

Then, the process allows on a next step 206 to enter a labeling phase for labeling each SOM (step 206-1 and 206-2) as further described with reference to FIG. 5.

Finally, the process allows on a next step 208 to compute a global Best Matching Unit among the whole SOMs as further described with reference to FIG. 6.

For the inference mode, the process allows to operate directly the computing step 208 on a plurality of SOMs that have been trained during the previously described learning phase.

Figure 3:
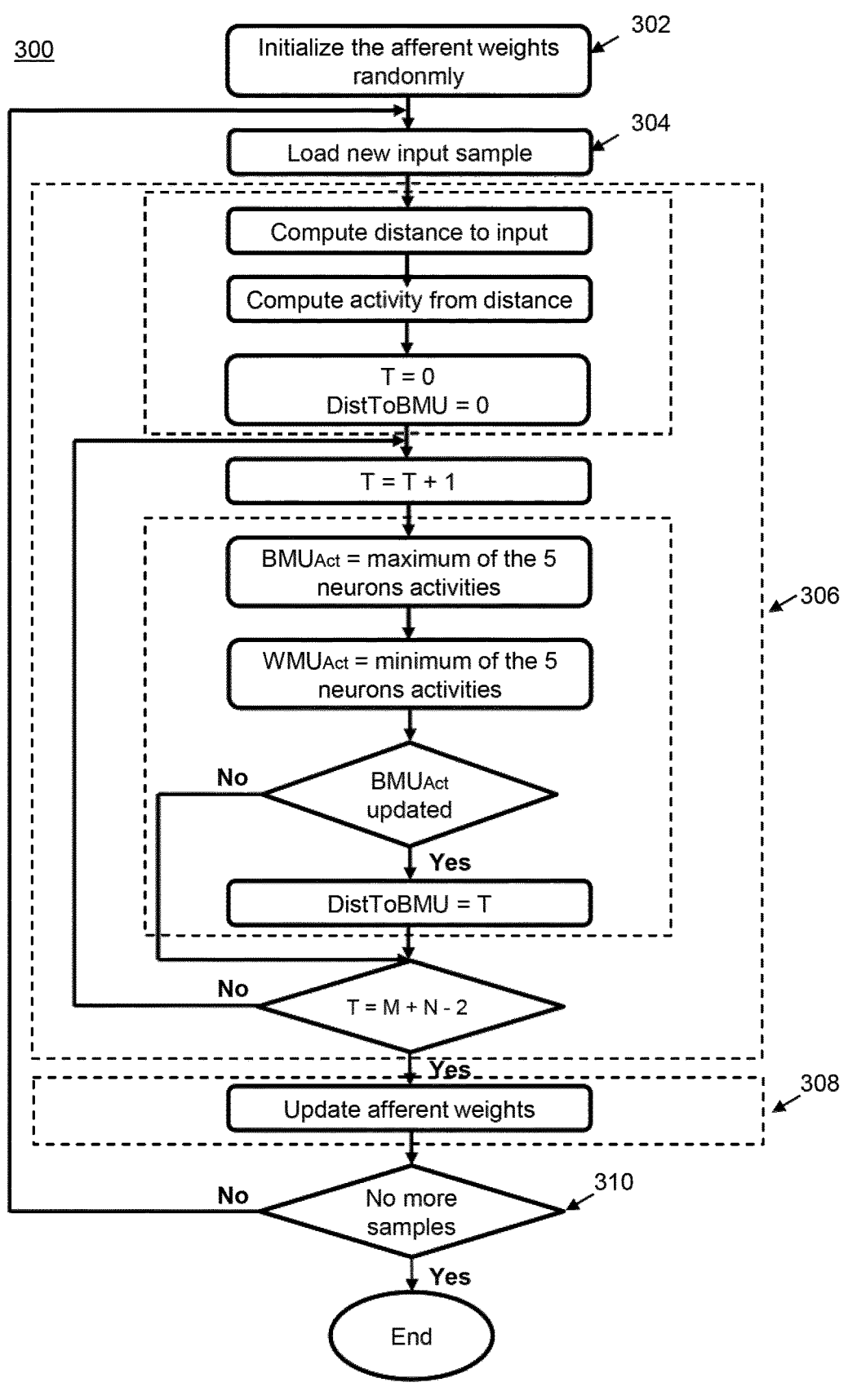
FIG. 3 shows a flow chart of the steps of a unimodal learning process for a KSOM model in accordance with an embodiment of the present invention.

Going now to FIG. 3, a flow chart 300 of the steps of a unimodal learning process of a SOM (step 202 of FIG. 2), in accordance with the present invention is described. In a preferred embodiment, the unimodal learning process is based on the KSOM algorithm shown on algorithm 1 below, while the present invention allows for the implementation of other SOM algorithms like the DSOM or PCSOM ones.

After a random initialization of afferent weights 302, the unimodal learning process generally comprises two main steps: a first general step 306 for the election of the Best Matching Unit (BMU) with respect to an input sample 304 (i.e. finding the 'winning neuron' whose weight vector lies closest to the weight vector of the input sample), and a second general step 308 for the adaptation of the afferent weights for all neurons of the SOM with respect to the results of the election step.

The process operates iteratively 310 for all input samples before ending.

Algorithm 1 below shows the original KSOM algorithm introduced by Kohonen. It is to be noted that $t_f$ is the number of epochs, i.e. the number of times the whole training dataset is presented.

---
Algorithm 1:
---
Kohonen SOM algorithm
---

1: Initialize the network as a two-dimensional array of k neurons, where each neuron n with m inputs is defined by a two-dimensional position $p_n$ and a randomly initialized m-dimensional weight vector $w_n$.
2: for t from 0 to $t_f$ do
3:   for every input vector v do
4:     for every neuron n in the network do
5:       Compute the afferent activity $a_n$:

$$a_n = e^{-\frac{\|v - w_n\|}{\alpha}}$$

(1)

7

-continued

| Algorithm 1: |
| --- |
| Kohonen SOM algorithm |

6:　　end for
7:　　Compute the winner s such that:

$$a_s = \max_{n=0}^{k-1}(a_n) \quad (2)$$

8:　　for every neuron n in the network do
9:　　　　Compute the neighborhood function $h_\sigma(t, n, s)$:

$$h_\sigma(t, n, s) = e^{-\frac{\|p_n - p_s\|^2}{2\sigma(t)^2}} \quad (3)$$

10:　　　　Update the weight $w_n$ of the neuron n:

$$w_n = w_n + \epsilon(t) \times h_\sigma(t, n, s) \times (v - w_n) \quad (4)$$

11:　　end for
12:　end for
13:　Update the learning rate $\epsilon(t)$:

$$\epsilon(t) = \epsilon_i \left(\frac{\epsilon_f}{\epsilon_i}\right)^{t/t_f} \quad (5)$$

14:　Update the width of the neighborhood $\sigma(t)$:

$$\sigma(t) = \sigma_i \left(\frac{\sigma_f}{\sigma_i}\right)^{t/t_f} \quad (6)$$

15: end for

In a preferred embodiment, each SOM assigned to one modality is trained using the unsupervised learning through distributed computing means implemented on an iterative grid, wherein each neuron of the grid is a dedicated hardware computing means. The skilled person would find a more complete description of an iterative grid with distributed computing means to operate the process shown on FIG. 3, in the following article of the inventors L. Rodriguez, L. Khacef, and B. Miramond, "A distributed cellular approach of large scale SOM models for hardware implementation," in IEEE Image Processing and Signals, Sophia-Antipolis, France, 2018.

At the end of process 300, each SOM has learned the neurons afferent weights.

Figure 4:
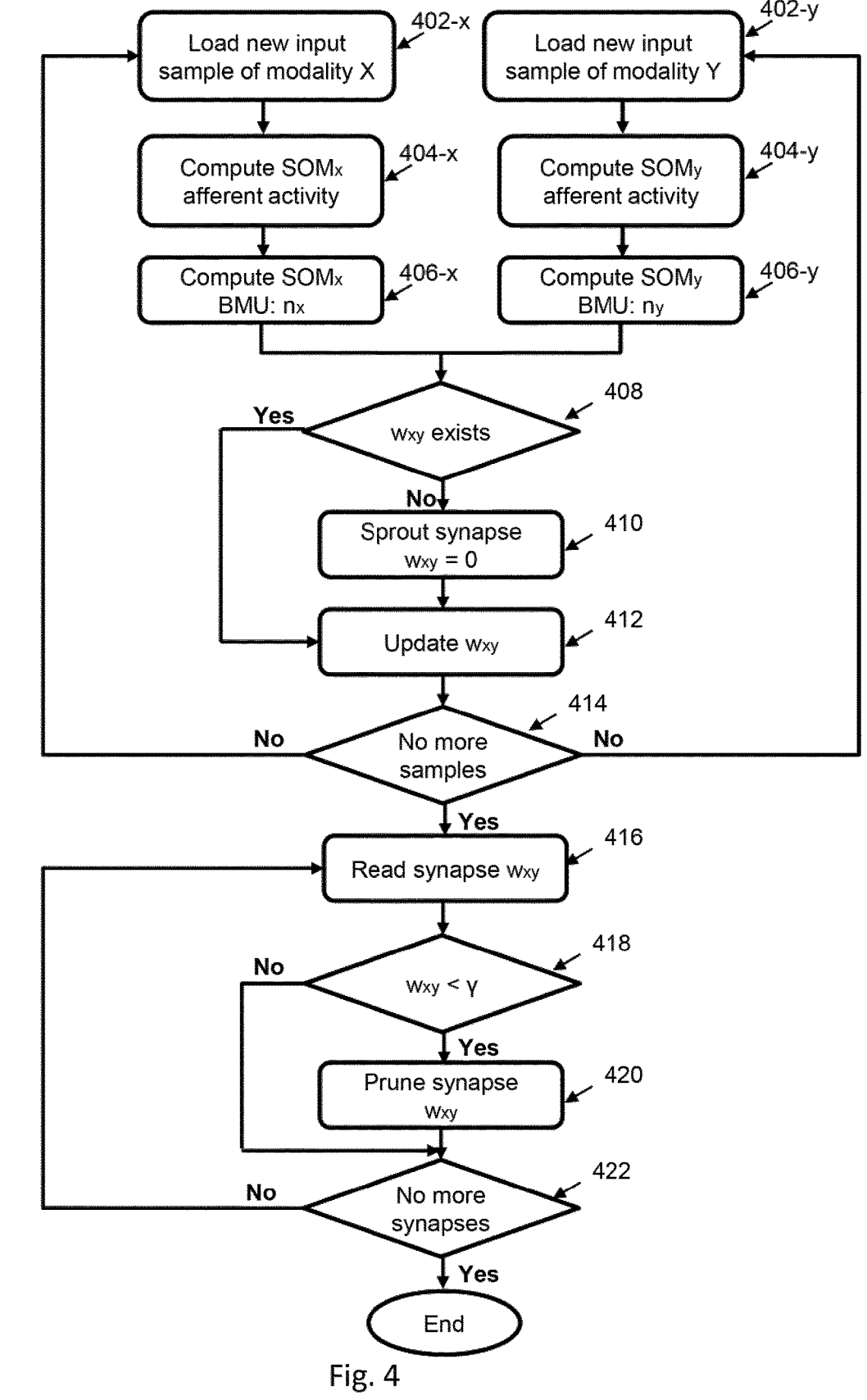
FIG. 4 shows a flow chart of the steps of a multimodal association process in accordance with an embodiment of the present invention.

Going now to FIG. 4, a flow chart 400 of the steps of a multimodal association process (step 204 of FIG. 2) in accordance with an embodiment of the present invention is described.

Algorithm 2 below shows an algorithm developed by the inventors for implementing the multimodal association, to be read in conjunction with FIG. 4.

| Algorithm 2: Multimodal association algorithm |
| --- |
| 1:　　Learn neurons afferent weights for $SOM_x$ and $SOM_y$ corresponding to modalities x and y respectively. |
| 2:　　for every multimodal input vectors $v_x$ and $v_y$ do |
| 3:　　　　Compute the $SOM_x$ and $SOM_y$ neurons activities. |
| 4:　　　　Compute the unimodal BMUs $n_x$ and $n_y$ with activities $a_x$ and $a_y$ respectively. |
| 5:　　　　if Lateral connection $w_{xy}$ between $n_x$ and $n_y$ does not exist then |
| 6:　　　　　　Sprout (create) the connection $w_{xy} = 0$. |

8

-continued

| Algorithm 2: Multimodal association algorithm |
| --- |
| 7:　　　　else |
| 8:　　　　　　Update lateral connection $w_{xy}$: |
| 9:　　　　　　if Hebb's learning then |
| 10:　　　　　　　　$w_{xy} = w_{xy} + \eta \times a_x \times a_y$　(7) |
| 11:　　　　　　else if Oja's learning then |
| 12:　　　　　　　　$w_{xy} = w_{xy} + \eta \times \left(a_x \times a_y - w_{xy} \times a_y^2\right)$　(8) |
| 13:　　　　　　end if |
| 14:　　　　end if |
| 15:　　end for |
| 16:　　for every neuron in $SOM_x$ do |
| 17:　　　　Sort the lateral synapses $w_{xy}$ and deduce the pruning threshold $\gamma$. |
| 18:　　　　for every lateral synapse $w_{xy}$ do |
| 19:　　　　　　if $w_{xy} < \gamma$ then |
| 20:　　　　　　　　Prune (delete) the connection $w_{xy}$. |
| 21:　　　　　　end if |
| 22:　　　　end for |
| 23:　　end for |

For sake of clarity, the process is described for an association of two modalities, a modality X processed with a first $SOM_X$, and a modality Y processed with a second $SOM_Y$. However, the person skilled in the art would generalize the principles to any number of modalities and the respective associated SOMs.

The process comprises a first group of three steps 402 to 406 which are similarly operated for each SOM and which consist in:

(402) loading a new input sample of the respective modality, i.e. step 402-x allows for loading a new input sample $v_x$ of modality X and step 402-y allows for loading a new input sample $v_y$ of modality Y;

(404) computing the SOM afferent activity, i.e. step 404-x allows for computing the afferent neuron activity $a_x$ for $SOM_x$ and step 404-y allows for computing the afferent neuron activity $a_y$ for $SOM_y$; and (406) computing the Best Matching Unit for each SOM with respective activity, i.e. step 406-x allows for computing the unimodal BMU denoted $n_x$ (as for neuron x) for $SOM_x$ with activity $a_x$, and step 406-y allows for computing the unimodal BMU denoted $n_y$ (as for neuron y) for $SOM_y$ with activity $a_y$.

In a preferred embodiment, the SOM afferent activity is computed on step 404 following equation (1) in algorithm 1, where v is the input vector, $w_n$ and $a_n$ are respectively the weights vector and the activity of a neuron n, parameter $\alpha$ is the width of a Gaussian kernel.

The process continues on a next step 408, to determine if a lateral connection or lateral synapse $w_{xy}$ already exists between the previously determined BMU of each SOM, i.e. if a lateral connection exists between $n_x$ and $n_y$. If no connection already exists, the process allows 410 to create a new one; else the process allows for updating 412 the existing connection.

For the person skilled in the art of brain studying, the creation of connection is known as 'sprouting'. Indeed, brain's plasticity, also known as neuroplasticity, can be divided into two distinct forms of plasticity: (1) the structural plasticity that changes the neurons connectivity by sprouting (creating) or pruning (deleting) synaptic connections between neurons, and (2) the synaptic plasticity that modifies (increasing or decreasing) existing synaptic connections strength.

In one embodiment, step 412 of modifying the existing connection may be implemented using Hebbian's rules. The original Hebbian learning principle proposed by Hebb in 1949 states that "when an axon of cell A is near enough to excite a cell B and repeatedly or persistently takes part in firing it, some growth process or metabolic change takes place in one or both cells such that A's efficiency, as one of the cells firing B, is increased." This means in other words, that any two neurons that are repeatedly active at the same time will tend to become "associated" so that activity in one facilitates activity in the other. The Hebb's learning rule is expressed by equation (7) in algorithm 2.

In another embodiment, step 412 of modifying the existing connection may be implemented using Oja's rules which are Hebbian-like rules as proposed by Oja in 1982, which adds a 'forgetting' parameter and solves a stability problem of Hebb's rules with a form of local multiplicative normalization for the neurons weights. The Oja's learning rule is expressed by equation (8) in algorithm 2.

In both equations (7) and (8), $\eta$ is a learning rate. In an experimental embodiment, $\eta$ is set at 1.

Back to FIG. 4, the process iterates 414 with a new input sample on each SOM until no more samples are to be processed (branch Yes of box 414).

Next, the process enters an iteration loop (steps 416 to 422) for all lateral connections $w_{xy}$. For each lateral connection 416, the process allows determining 418 if the lateral connection is lower than a pre-defined threshold $\gamma$ relative to a number or a percentage of synapses to prune (delete). In a preferred embodiment, the threshold is set to 20% according to results shown in FIG. 7b. If yes, the process allows pruning 420 said lateral connection; else the process allows determining 422 if other lateral connection is to be processed or not before ending.

At the end of process 400, the multimodal association is learned via the remaining lateral synaptic weights.

Figure 5:
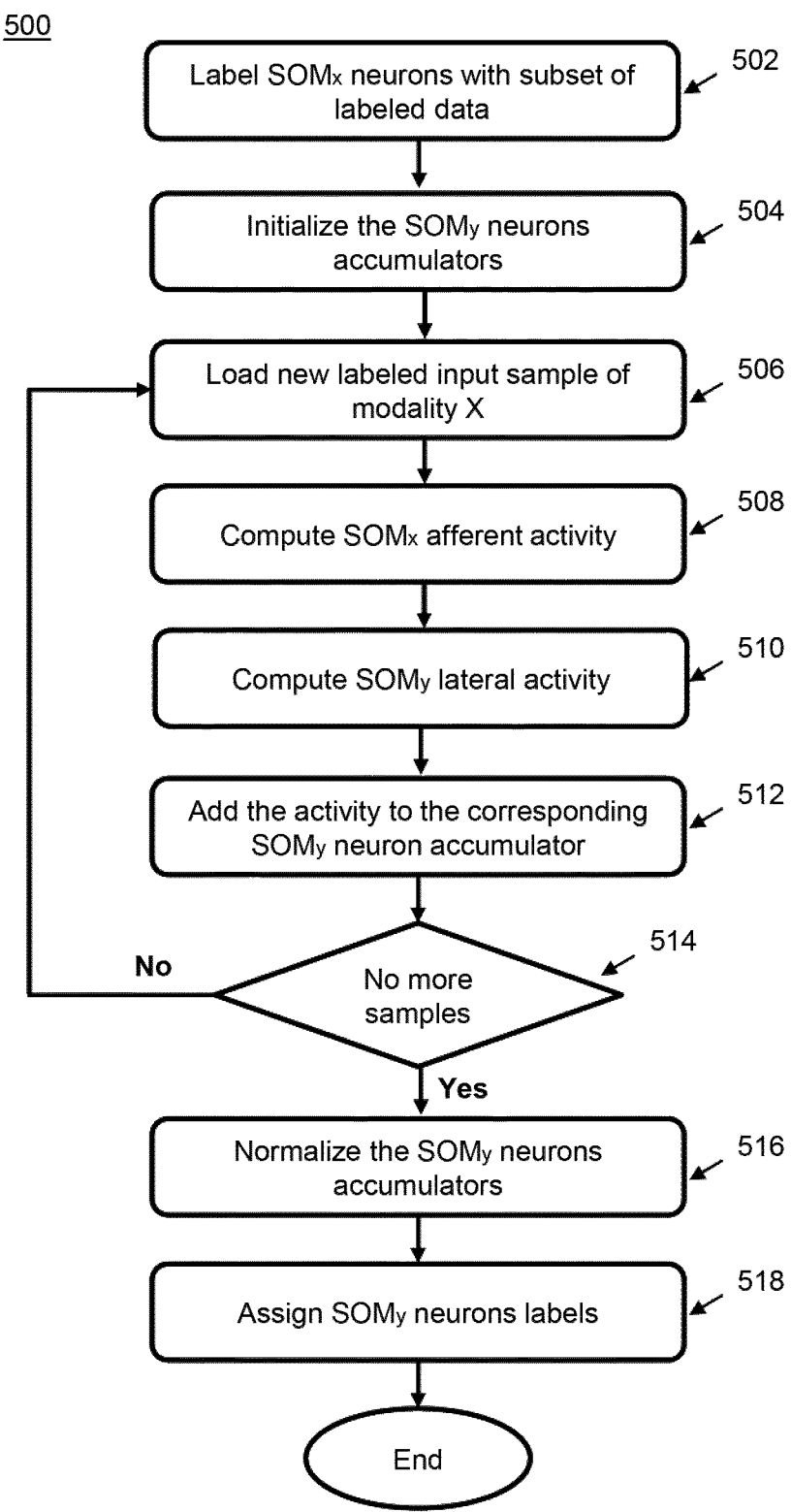
FIG. 5 shows a flow chart of the steps for the labeling of SOMs in accordance with an embodiment of the present invention.

Going now to FIG. 5, a flow chart of the steps 500 (step 206 of FIG. 2) for labeling the SOMs in accordance with an embodiment of the present invention, is described.

One skilled in the art would appreciate that labelling is generally considered as an operation between training and test where each neuron is assigned the class it represents in the training dataset. Labeling is a necessary operation for any classification task based on unsupervised learning. A labeling algorithm can be summarized in four main phases: a first phase allows calculating the neurons activations to the input samples from the Euclidean distance, following equation (1); a second phase allows electing the Best Matching Unit (BMU), i.e. the neuron with the maximum activity; a third phase is an accumulation phase where each neuron accumulates in a corresponding class accumulator, its normalized activation (simple division) with respect to the BMU activity, and where the three previous steps are repeated for every sample of the labeling subset; and in a final fourth phase, the label of each neuron is chosen according to the class accumulator that has the maximum activity.

The labeling approach proposed in the present invention, is named as divergence algorithm as it is based on a mechanism which allows labeling one modality of the multimodal association based on the other. It means that for two modalities x and y, since one first modality is activated based on the other, the divergence mechanism allows to label the neurons of the second SOMy from the activity and labels induced from the neurons of the first SOMx.

Advantageously, the labeling of the neurons of the first SOMx is based on a labeling subset of modality x. The inventors have determined that only one labeled subset of a single modality is required to label both modalities, taking profit of a bidirectional aspect of the "reentry" principles well-known by those skilled in the art of brain study.

The proposed divergence algorithm for labeling is shown on algorithm 3 below to be read in conjunction with FIG. 5.

---

Algorithm 3:

Divergence algorithm for labeling

1: Initialize class$_{act}$ as a two-dimentionnal array of accumulators: the first dimension is the neurons and the second dimension is the classes.
2: for every input vector $v_x$ of the x-modality labeling set with label l do
3:  for every neuron x in the SOM$_x$ map do
4:   Compute the afferent activity $a_x$:

$$a_x = e^{-\frac{\|v_x - w_x\|}{\beta}} \qquad (9)$$

5:  end for
6:  for every neuron y in the SOM$_y$ map do
7:   Compute the divergent activity $a_y$ from the SOM$_x$:

$$a_y = \max_{x=0}^{n-1} (w_{xy} \times a_x) \qquad (10)$$

8:   Add the normalized activity with respect to the max activity to the corresponding accumulator:

$$\text{class}_{act}[y][l] += a_y \qquad (11)$$

9:  end for
10: end for
11: Normalize the accumulators class$_{act}$ with respect to the number of samples per class.
12: for every neuron y in the SOM$_y$ map do
13:  Assign the neuron label neuron$_{lab}$:

$$\text{neuron}_{lab} = \text{argmax}(\text{class}_{act}[y]) \qquad (12)$$

14: end for

---

For sake of clarity, the process of labeling is described on the same example of two SMOs, namely SOMx and SOMy as previously. The process for labeling the SOMs begins with a step 502 of labeling the first SOMx with a subset of labeled training dataset. In their research, the inventors have tried to minimize the size of a random labeled subset of a training dataset, while keeping the best classification accuracy. Their study has shown that only 01% of randomly taken labeled samples from a training dataset is enough for the MNIST classification. One knows that the MNIST database (Modified National Institute of Standards and Technology database) is a large database of handwritten digits that is commonly used for training and testing in the field of machine learning. In a preferred embodiment, labeling of the first SOMx is made with 01% of labeled data of the training dataset.

On a next step 504, the process allows to initialize neurons accumulator modules of each cell of the SOMy.

Next, the process enters a loop from steps 506 to 514. Steps 506 and 508 allow loading (506) a new labeled input sample of the first modality X, and computing (508) the afferent activity $a_x$ of each cell of SOMx, as shown by equation (9) of algorithm 3. Next the process allows for computing 510 the lateral activity also called divergent activity of the cells of the other SOMy that are in a lateral connection $w_{xy}$ with a cell of the first SOMx as shown by equation (10) of algorithm 3.

The next step 512 allows adding the computed lateral activity to the corresponding accumulator of the SOMy neurons. In a preferred embodiment, the computed lateral activity is normalized as shown by equation (11) of algorithm 3 before being stored in the accumulator.

The process iterates 514 until no more samples (i.e. no more input vectors) are to be processed. The process then continues with step 516 to normalize the neurons accumulators over the number of samples per class, and assign on step 518 neurons labels neuron$_{lab}$ to the neurons of the SOMy, as shown by equation (12) of algorithm 3.

At the end of process 500, all neurons of all SOMs are labeled.

Figure 6:
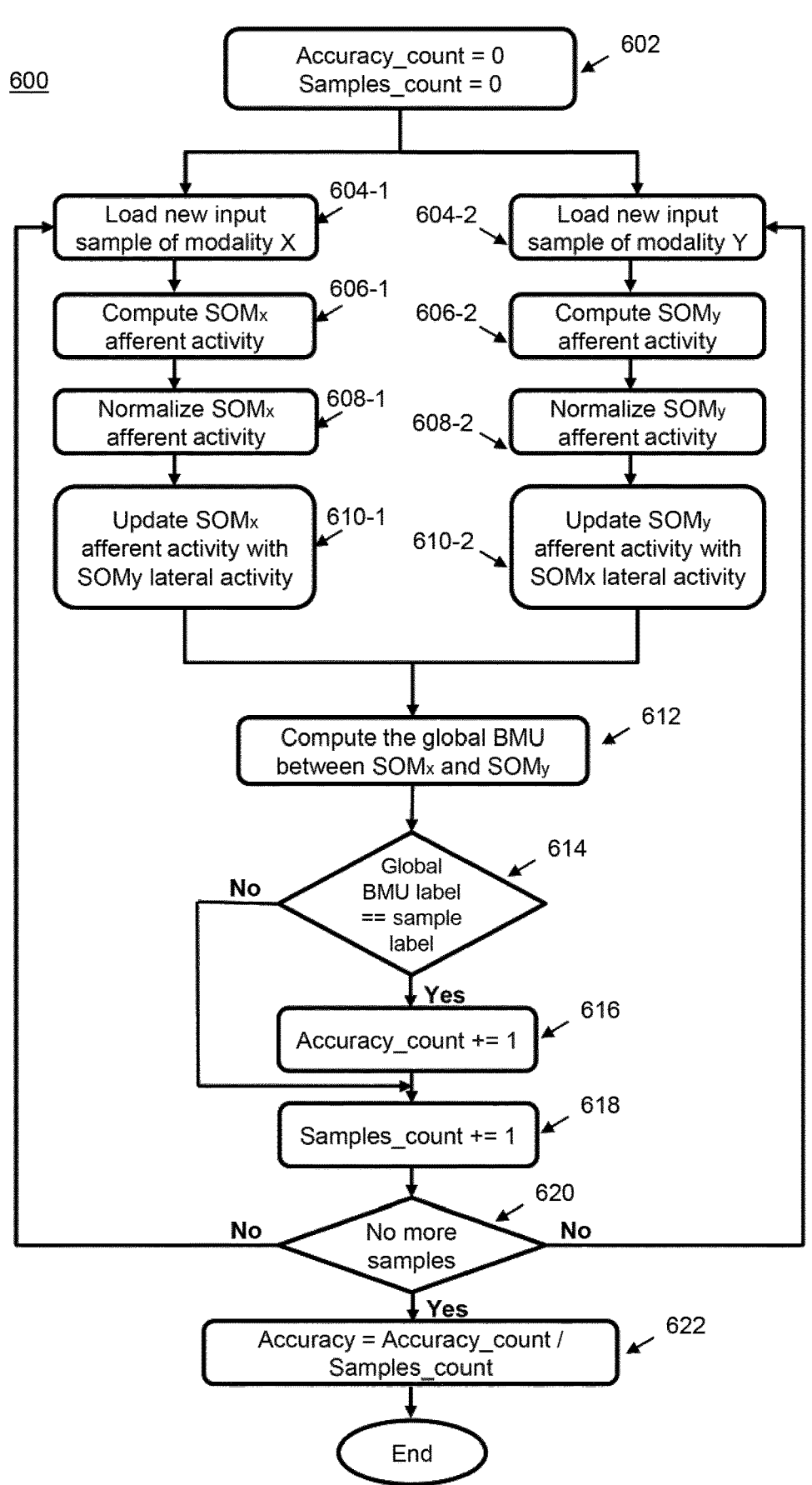
FIG. 6 shows a flow chart of the steps for computing a global BMU among multimodal SOMs, accordance with an embodiment of the present invention.

FIG. 6 shows a flow chart of the steps 600 for computing a global BMU among multimodal SOMs, in accordance with an embodiment of the present invention. It is to be appreciated that once the multimodal learning is done and all neurons from the SOMs are labeled, there is the need to converge the information of the different modalities to achieve a better processing and classification of a multimodal input.

Advantageously, the process allowing the convergence operation comprises three main phases: a first phase wherein each neuron of the different SOMs compute its activity based on the afferent activity, from a current input; a second phase wherein each neuron updates its afferent activity via a multiplication with the lateral activity from the neurons of another modality; and a third phase wherein all neurons from all SOMs compete to elect a winner, i.e. to compute a global Best Matching Unit with respect to all SOMs.

Advantageously, the convergence process offers both a cooperation amongst neurons from different SOMs and a competition amongst all neurons of all SOMs.

Algorithm 4 below shows the convergence algorithm to be read in conjunction with FIG. 6.

---
Algorithm 4:

Convergence algorithm for classification

---
1: for every multimodal input vectors $v_x$ and $v_y$ do
2:   Do in parallel every following step inter-changing modality x with modality y and vice-versa:
3:   Compute the afferent activities $a_x$ and $a_y$:
4:   for every neuron x in the SOM$_x$ map do
5:     Compute the afferent activity $a_x$:

$$a_x = e^{-\frac{\|v_x - w_x\|}{\beta}} \tag{13}$$

6:   end for
7:   Normalize (min-max) the afferent activities $a_x$ and $a_y$.
8:   Update the afferent activities $a_x$ and $a_y$ with the lateral activities based on the associative synapses weights $w_{xy}$:
9:   if Update with max$_{update}$ then
10:     for every neuron x in the SOM$_x$ map connected to n neurons from the the SOM$_y$ map do $$a_x = a_x \times \max_{x=0}^{n-1} (w_{xy} \times a_y) \tag{14}$$

12:     end for
13:   else if Update with sum$_{update}$ then
14:
15:     for every neuron x in the SOM$_x$ map connected to n neurons from the the SOM$_y$ map do

12

-continued

---
Algorithm 4:

Convergence algorithm for classification

---
16:                           (15)

$$a_x = a_x \times \frac{\sum_{x=0}^{n-1} (w_{xy} \times a_y)}{n}$$

17:     end for
18:   end if
19:   Compute the global BMU with the maximum activity between the SOM$_x$ and the SOM$_y$.
20: end for

---

Going now to FIG. 6, on a first step 602, the process allows initializing an accuracy counter and a sample counter. Still for sake of clarity, the process is described for two SOMs—SOMx and SOM—configured for processing respectively a modality x and a modality y of an input vector.

A concrete use of the proposed invention may be for example to classify hand gestures data received from a first sensor of the type Dynamic Vision Sensor (DVS) camera, and from a second sensor of the type Electromyography (EMG), to better control a robotic arm. However, the present invention may be useful in various fields of technology where the processing of data having multimodal representation, i.e. representation as digital images, videos, audio or speech signals, contribute to achieve a better technical result. The herein described algorithms allow processing the data on their low-level features (e.g. the pixel attributes for the images).

Back to FIG. 6, the process operates simultaneously several similar steps 604 to 610 on the different SOMs for a new input vector of different modalities. On step 604 a new input vector is loaded, i.e. input vector $v_x$ of modality x is loaded on step 604-1 for the first SOMx, and input vector $v_y$ of modality y is loaded on step 604-2 for the second SOMy. On next step 606, the process allows for computing the afferent activity as shown by equation (13) of algorithm 4, i.e. step 606-1 allows for computing the afferent activity $a_x$ of the cells of the first SOMx, and step 606-2 allows for computing the afferent activity $a_y$ of the cells of the second SOMy. Next, a normalization of the afferent activity is applied 608, i.e. step 608-1 allows for normalizing the afferent activity computed for the first SOMx, and step 608-2 allows for normalizing the afferent activity computed for the second SOMy. The next step 610 allows updating the afferent activity of one SOM with the lateral activity of another SOM based on the weights of the computed lateral connections as shown on equations (14) and (15) of algorithm 4, i.e. step 610-1 allows updating the afferent activity of the first SOMx with the lateral activity of the second SOMy based on the weights of computed lateral connections $w_{xy}$, and step 610-2 allows updating the afferent activity of the second SOMx with the lateral activity of the first SOMx based on the weights of computed lateral connections $w_{xy}$.

The process next allows for computing 612 a global Best Matching Unit between all the SOMs, i.e. determining the neuron between the first SOMx and the second SOMy having the maximum activity.

On a next steps 614 and 616, the process allows determining the accuracy of the computed BMU by checking 614 if the global BMU corresponds to the input vector label or not and by incrementing 616 or not the accuracy counter.

Then, the process loops back 620 to step 604 to load a new sample until no more sample is to be processed. The process further allows providing 622 an accuracy value.

The method reaches a multimodal accuracy of 95.07% on written/spoken digits classification, while the unimodal accuracies are respectively 87.04% and 75.14% on written and spoken digits. Therefore, the method achieves a gain of +08.03%.

Figure 7A:
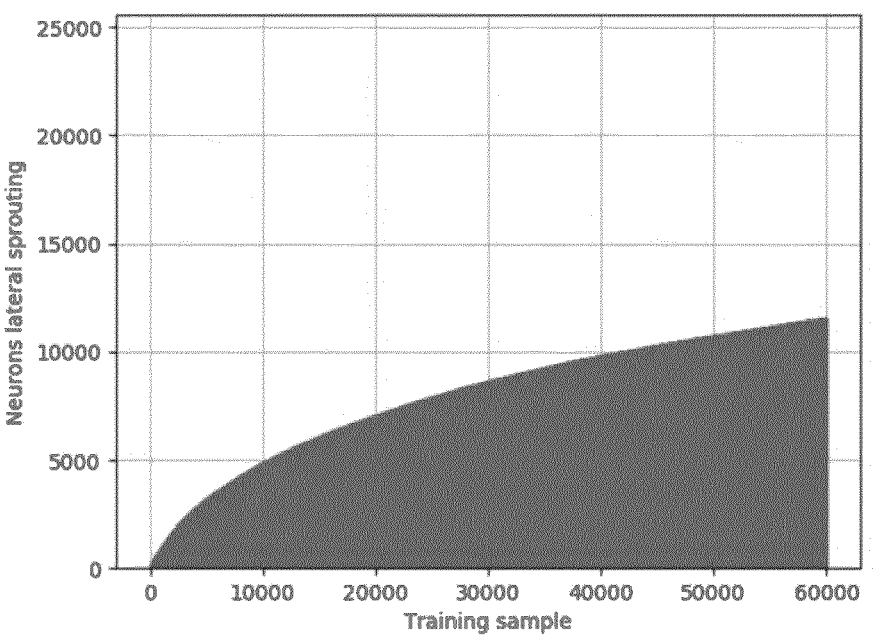
FIGS. 7a and 7b illustrate experimental results of the performance of the process of FIG. 4, respectively the neurons sprouting and the pruning operations.
Figure 7B:
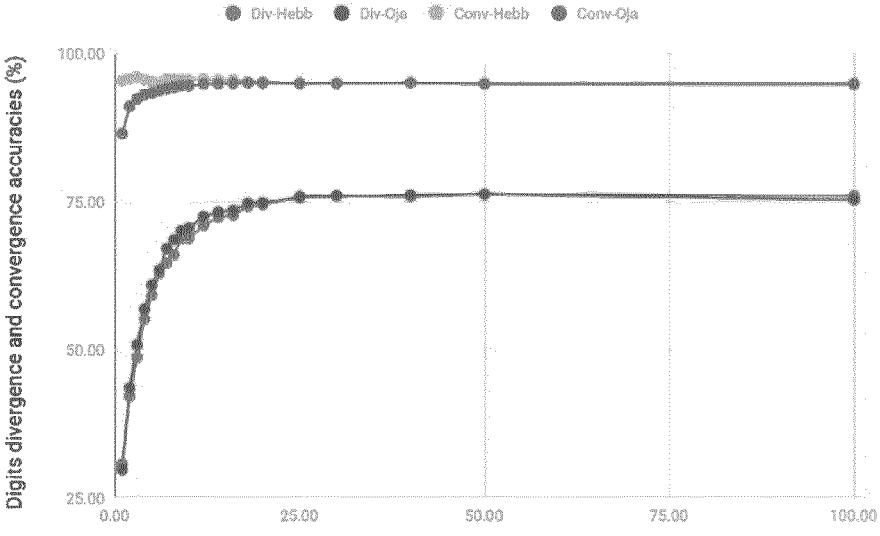

FIGS. 7a and 7b illustrate experimental results of the performance of the process of FIG. 4, respectively neurons sprouting and pruning.

Figure 8A:
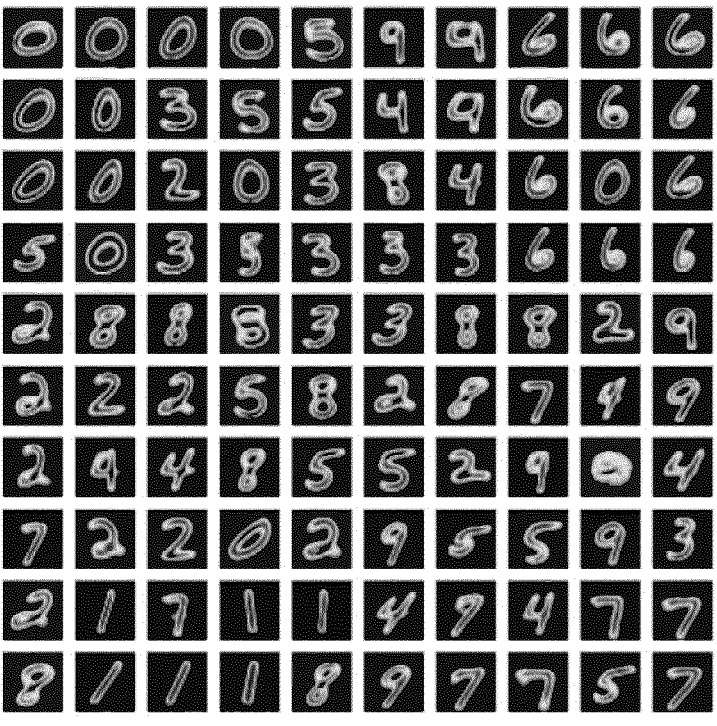
FIGS. 8a and 8b illustrate respectively neurons afferent weights and neurons labels resulting from MNIST learning with a KSOM model.
Figure 8B:
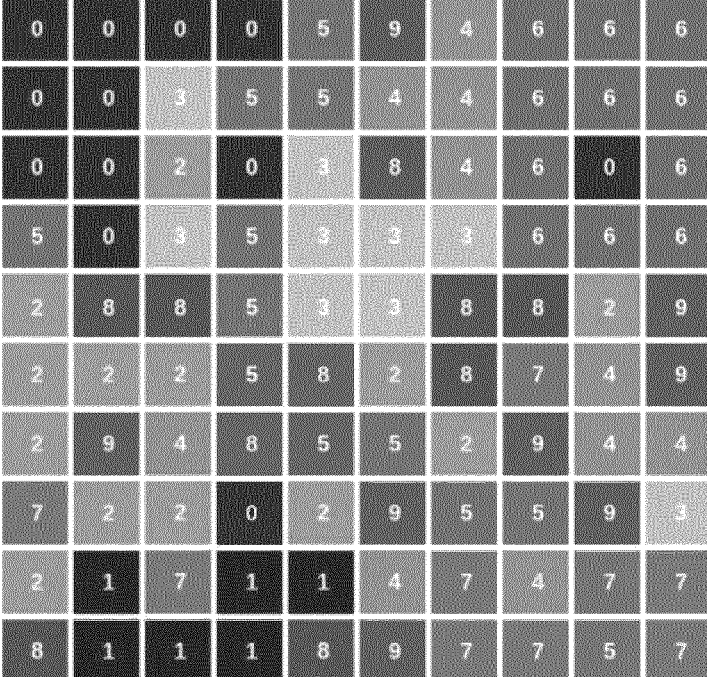
Figure 9A:
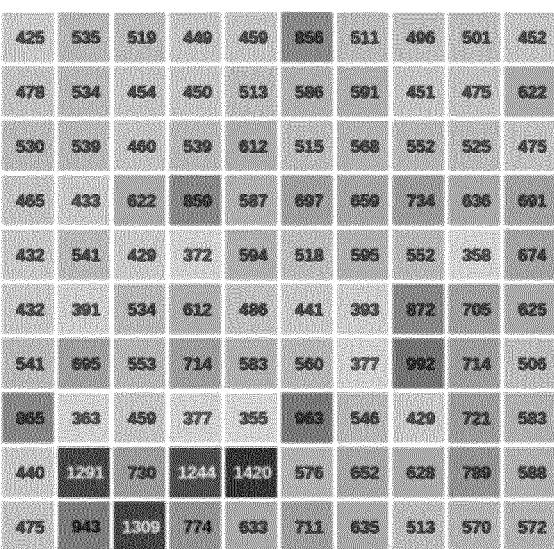
FIGS. 9a to 9d illustrate respectively the neurons BMU counters for the written digits training, spoken digits training, written digits test and spoken digits test.
Figure 9B:
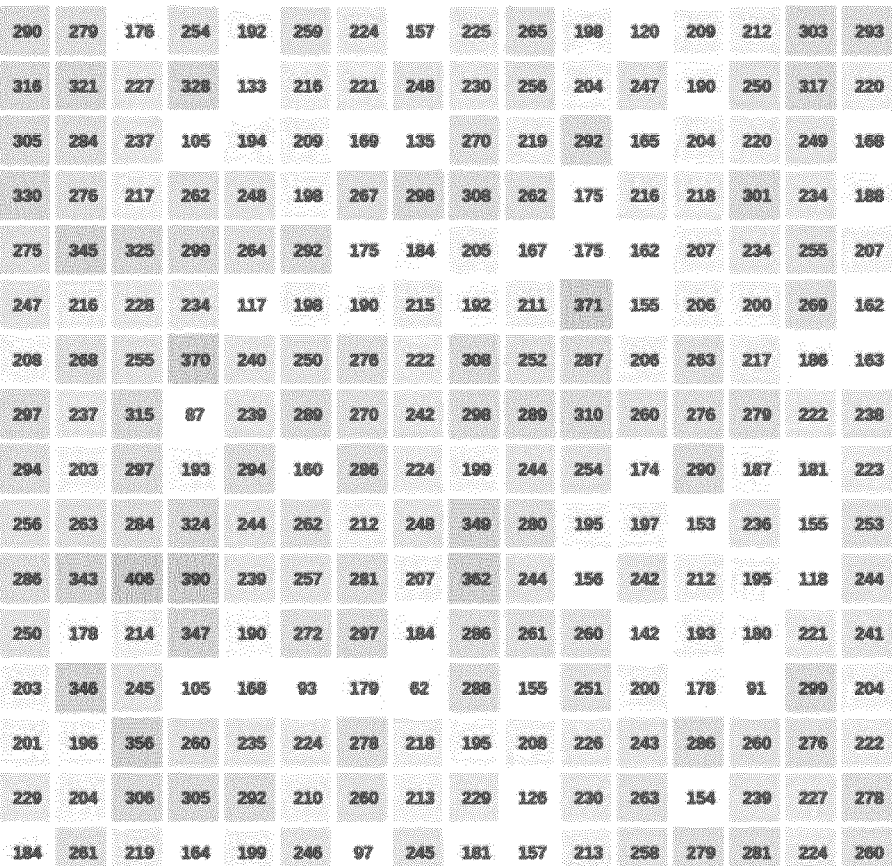
Figure 9C:
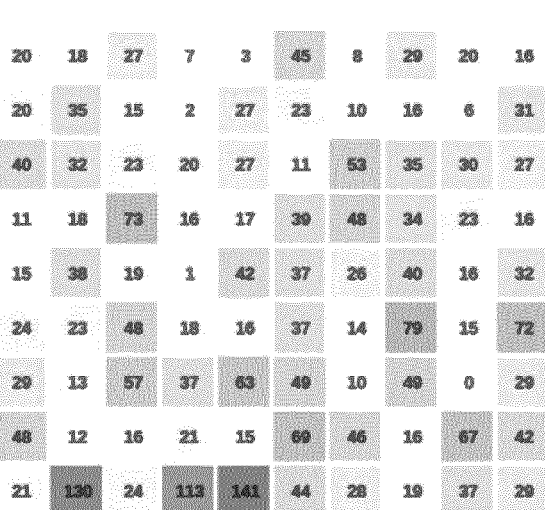
Figure 9D:
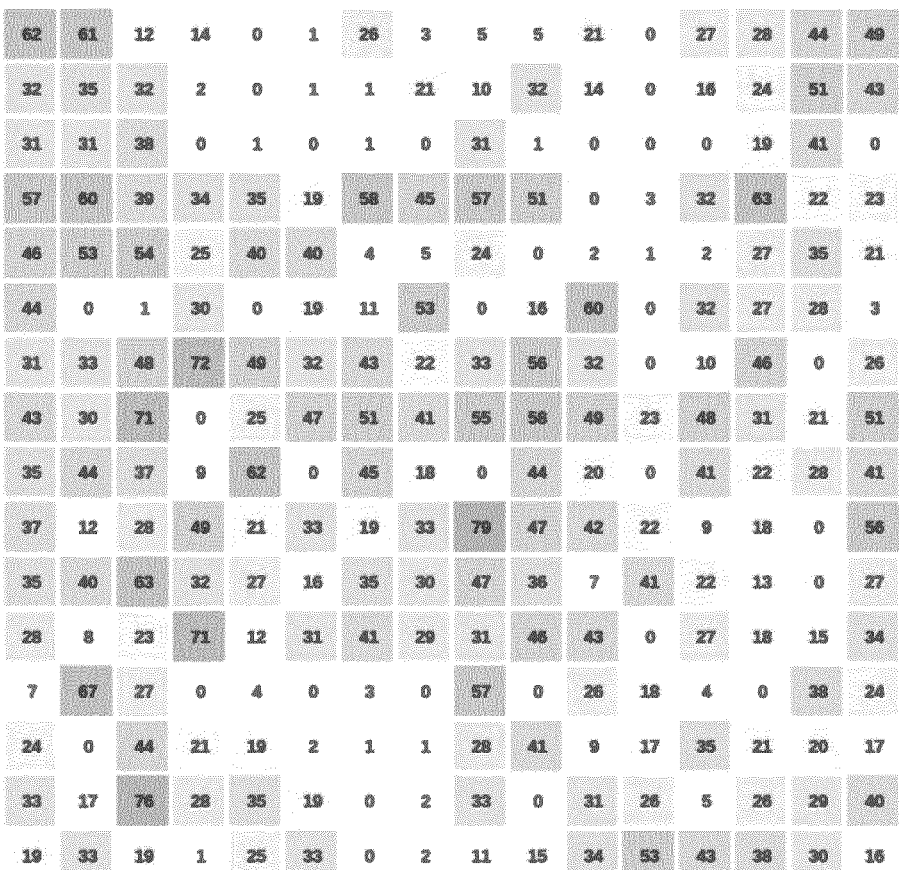

FIGS. 8a and 8b illustrate respectively neurons afferent weights and neurons labels resulting from MNIST learning with a KSOM model.

FIGS. 9a to 9d illustrate respectively the neurons BMU counters for the written digits training, spoken digits training, written digits test and spoken digits test.

FIG. 10 shows an embodiment of a hardware implementation for an iterative grid cells network to operate the method of the present invention. It is composed of Neural Processing Units (NPUs) locally inter-connected in a MESH topology. The input is time-multiplexed (i.e. for an image, it is received pixel by pixel at each clock edge) and broadcasted to each NPU. The NPU contains two main parts: the processing part "a" and the communication part "b". The communication part "b" is responsible of data exchange between a neuron and its closest neighbors, and the processing part "a" is responsible of all the neuron's computations, as previously described. It relies on a Finite Sate Machine (FSM) where each state, a FSM controller selects corresponding data and instruction from a Dual Ported Random Access Memory (DPRAM) that are to be computed in an Arithmetic and Logic Unit (ALU). The ALU stores the successive operations results in an accumulator ACC at each clock edge, before returning the final instruction result to the DPRAM. This process is repeated.

The invention claimed is:

1. A computer implemented method for multimodal data classification with brain-inspired unsupervised learning, the method comprising a learning mode and an inference mode, wherein the learning mode comprises:

training, with unsupervised learning based on a multimodal training dataset, each of at least two Artificial Neural Networks (ANNs), to provide a Best Matching Unit (BMU) for each of the at least two ANNs, each of the at least two ANNs being a self-organizing map (SOM) and being configured to process low-level features of a different modality of the multimodal training dataset, the multimodal training dataset comprising two or more modalities of images, videos, audio, and speech signals;

training, with unsupervised learning based on the multimodal training dataset, a multimodal association between the at least two ANNs, to provide a plurality of bidirectional lateral connections between co-activated Best Matching Units (BMUs);

labeling neurons of each of the at least two ANNs, wherein the labeling comprises:

labeling the neurons of one ANN of the at least two ANNs with an afferent activity based on a labeled subset of the multimodal training dataset; and labeling the neurons of remaining ANNs of the at least two ANNs with a lateral activity induced by the bidirectional lateral connections to the previously labeled ANN;

wherein the inference mode comprises:

loading a multimodal input data to each of the trained at least two ANNs;

computing for each labeled neuron of the at least two ANNs, an afferent activity based on the multimodal input data;

normalizing each computed afferent activity;

updating the normalized afferent activity of each labeled neuron of the at least two ANNs with a lateral activity from labeled neurons of the remaining ANNs; and electing a global BMU by determining the neuron having a maximum updated activity amongst all neurons of the at least two ANNs, a label of the global BMU being a predicted class of the multimodal input data.

2. The computer implemented method of claim 1, wherein the training of the multimodal association comprises:

creating the plurality of bidirectional lateral connections between the co-activated BMUs of each of the at least two trained ANNs; or updating existing bidirectional lateral connections between the co-activated BMUs of each of the at least two ANNs; and deleting those existing lateral connections that are below a pre-determined threshold for each neuron.

3. The computer implemented method of claim 1, wherein the labeling of the neurons of each of the at least two ANNs comprises:

initializing neuron accumulator modules of each neuron of the remaining ANNs;

computing afferent activities of each neuron of said one ANN based on the labeled subset;

computing lateral activities of the neurons of the remaining ANNs that are in a bidirectional lateral connection with said one ANN;

adding each computed lateral activity to the corresponding neuron accumulator module;

normalizing the neuron accumulator modules over a number of samples per class; and assigning labels to the neurons of the remaining ANNs.

4. The computer implemented method of claim 1, wherein the training of each of the at least two ANNs is run with a Kohonen algorithm.

5. The computer implemented method of claim 1, wherein the labeled subset of the multimodal training dataset is 1% of randomly labeled samples from the multimodal training dataset.

6. The computer implemented method of claim 1, wherein the computer implemented method is operated on a neuromorphic hardware structure comprising a plurality of ANNs to classify an input with different modalities, wherein each modality is processed by one or several ANNs.

7. The computer implemented method of claim 1, further comprising determining an accuracy of a computation of the global BMU by checking if the elected global BMU corresponds to an input data label or not.

8. A neuromorphic computing system for multimodal classification based on brain-inspired unsupervised learning, the neuromorphic computing system comprising a hardware circuit that implements the method of claim 1.

9. The neuromorphic computing system of claim 8, wherein each one of the at least two SOM-like ANNs is a Kohonen SOM (KSOM), a Dynamic SOM (DSOM) or a Pruning Cellular SOM (PCSOM) ANN.

10. A Field Programmable Gate Array (FPGA) comprising a neuromorphic computing system for operating a multimodal data classification with brain-inspired unsupervised learning, the neuromorphic computing system comprising a hardware circuit that implements the method of claim 1.

11. An Application Specific Integrated Circuit (ASIC) comprising a neuromorphic computing system for operating a multimodal data classification with brain-inspired unsupervised learning, the neuromorphic computing system comprising a hardware circuit that implements the method of claim 1.

12. A non-transitory computer readable medium having a program encoded thereon which when the program is executed by a computer, causes the computer to carry out the method according to claim 1.

\* \* \* \* \*